July 9, 1929.　　　P. W. LOEW ET AL　　　1,719,844
BOTTLE CLEANING APPARATUS
Filed Feb. 19, 1926　　　5 Sheets-Sheet 5
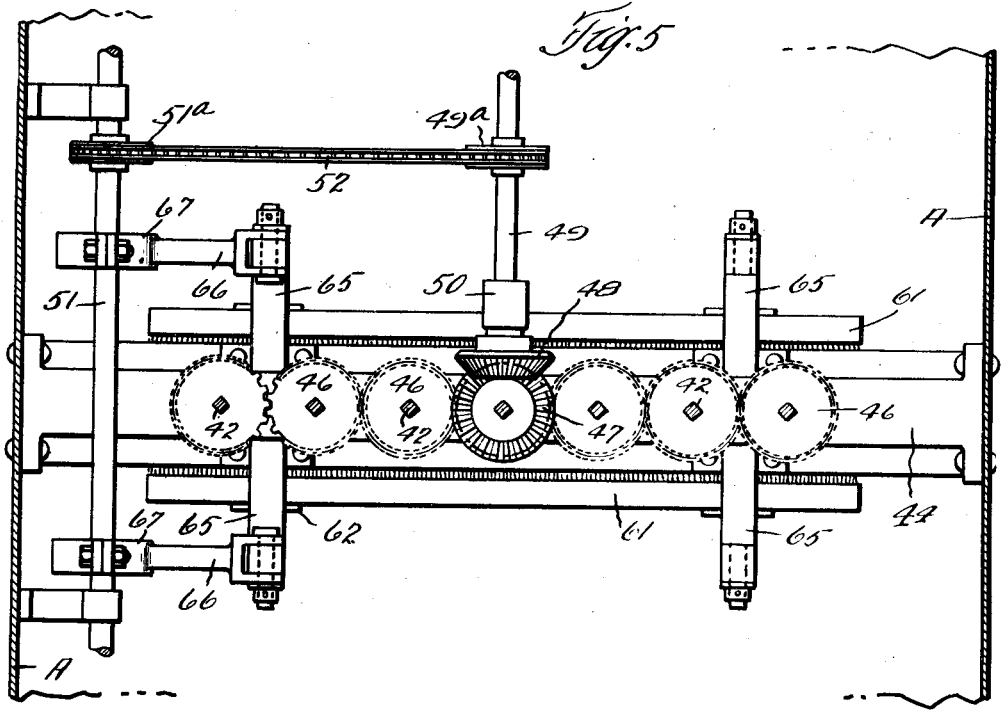
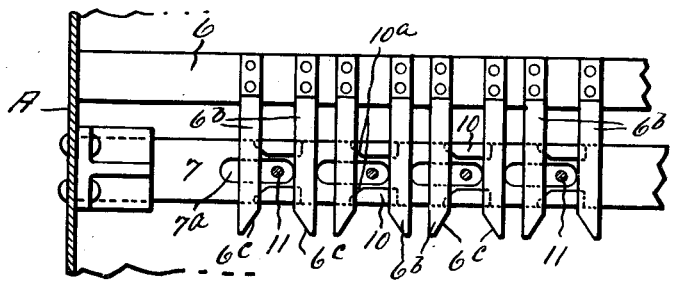
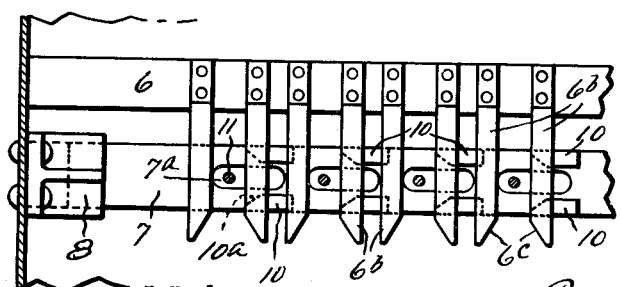
INVENTORS
Paul W. Loew,
Robert R. McKechnie,
By Hull, Brock & West,
Attys.

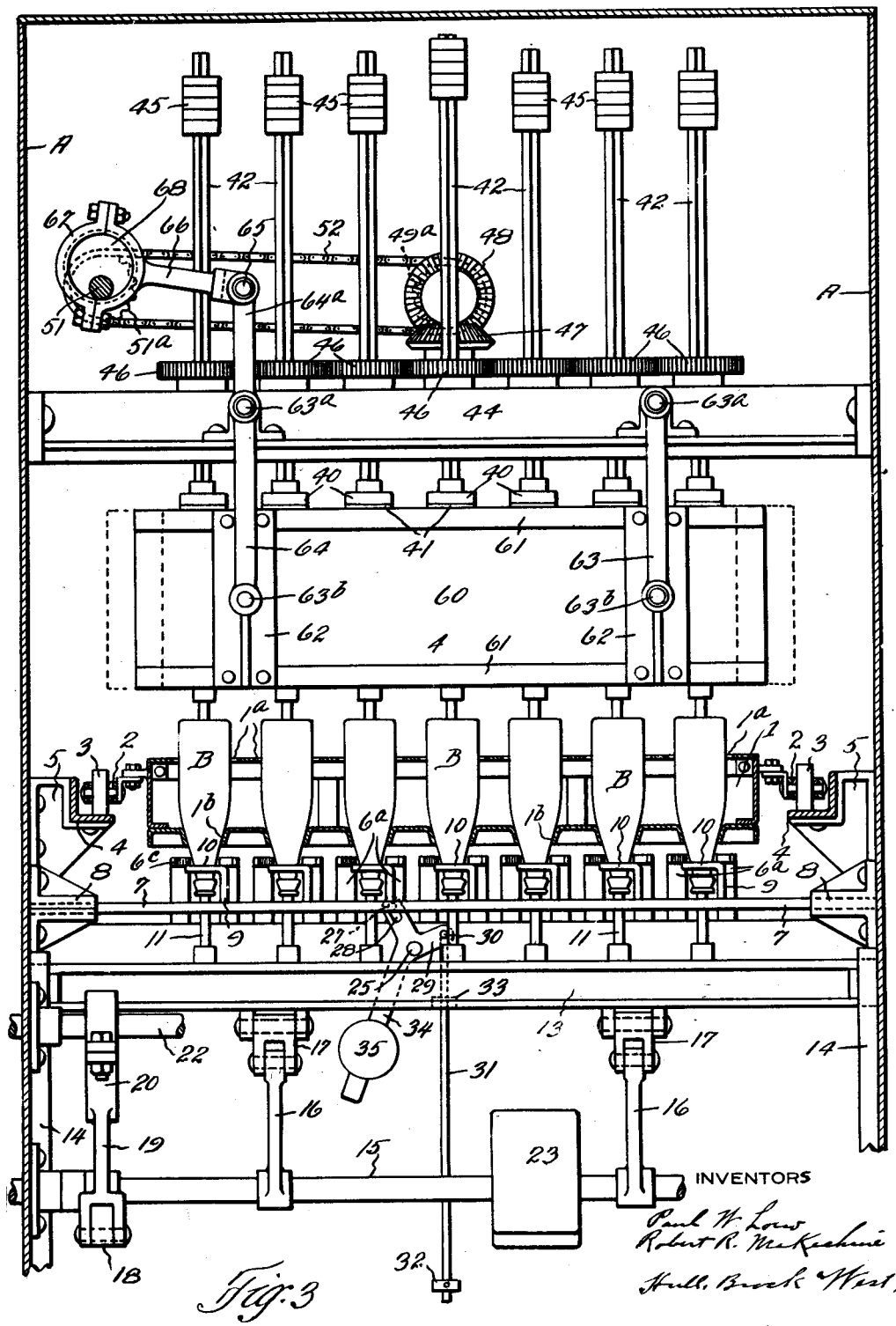
Fig. 3
INVENTORS

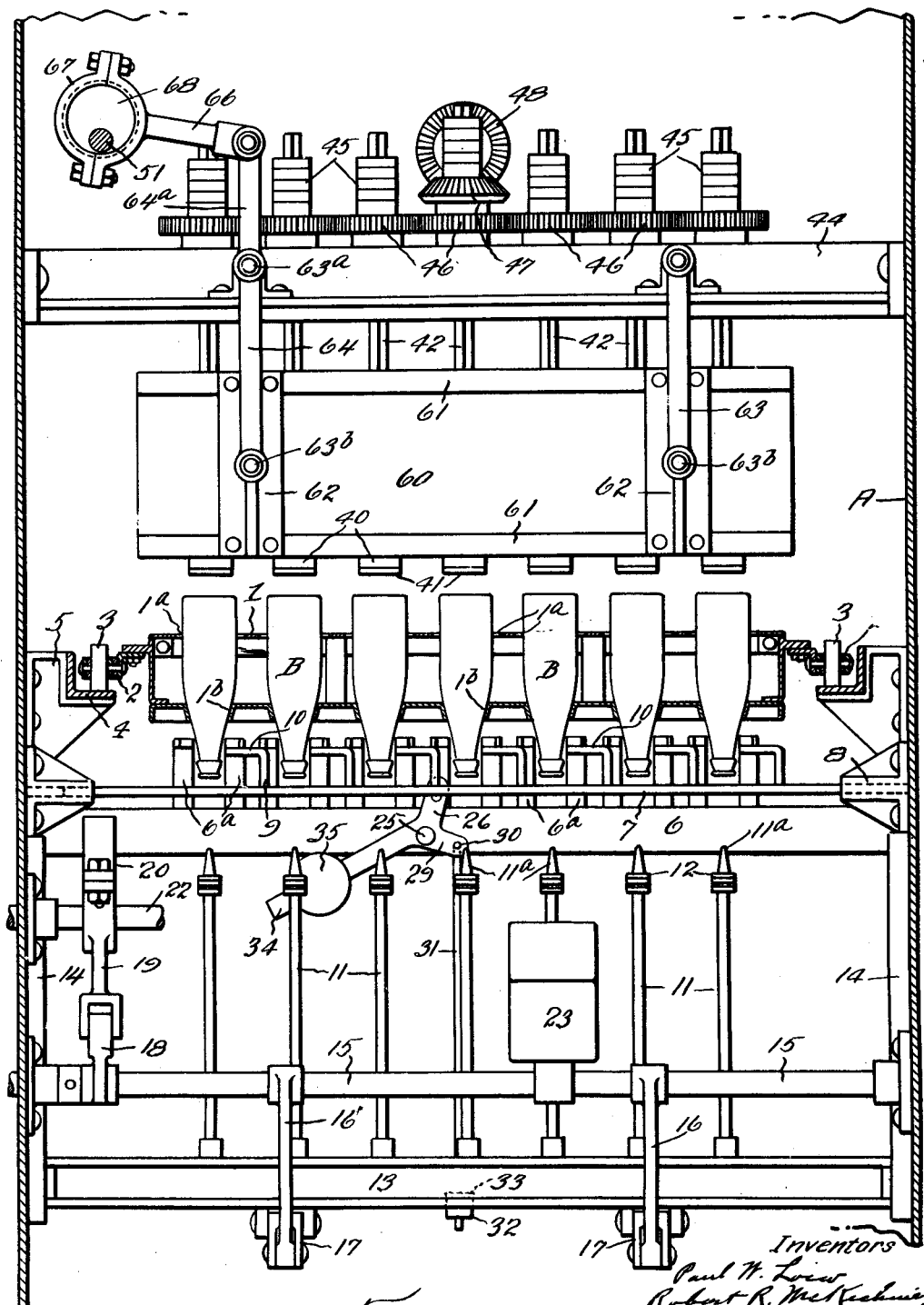

Patented July 9, 1929.

1,719,844

UNITED STATES PATENT OFFICE.

PAUL W. LOEW, OF AVON LAKE, AND ROBERT R. McKECHNIE, OF CLEVELAND, OHIO, ASSIGNORS, BY MESNE ASSIGNMENTS, TO THE CLEVELAND TRUST COMPANY, OF CLEVELAND, OHIO, A CORPORATION OF OHIO.

BOTTLE-CLEANING APPARATUS.

Application filed February 19, 1923. Serial No. 89,284.

This invention relates to apparatus for cleaning bottles, and more particularly to apparatus of the general type shown in Patent No. 1,313,706, issued Aug. 19, 1919 to Charles H. Loew and John R. Gruetter and wherein the bottles are mounted on transverse carrier elements forming part of an endless conveyor by which the bottles are intermittently advanced through the apparatus and are subjected, during their transit therethrough, to various internal and external treatments with liquid, their exteriors and interiors also being subjected to the action of brushes, as part of the cleaning treatment. The particular invention disclosed herein relates more especially to the mechanism for brushing the outsides of the bottles while in transit through an apparatus of the character referred to.

Figure 1:
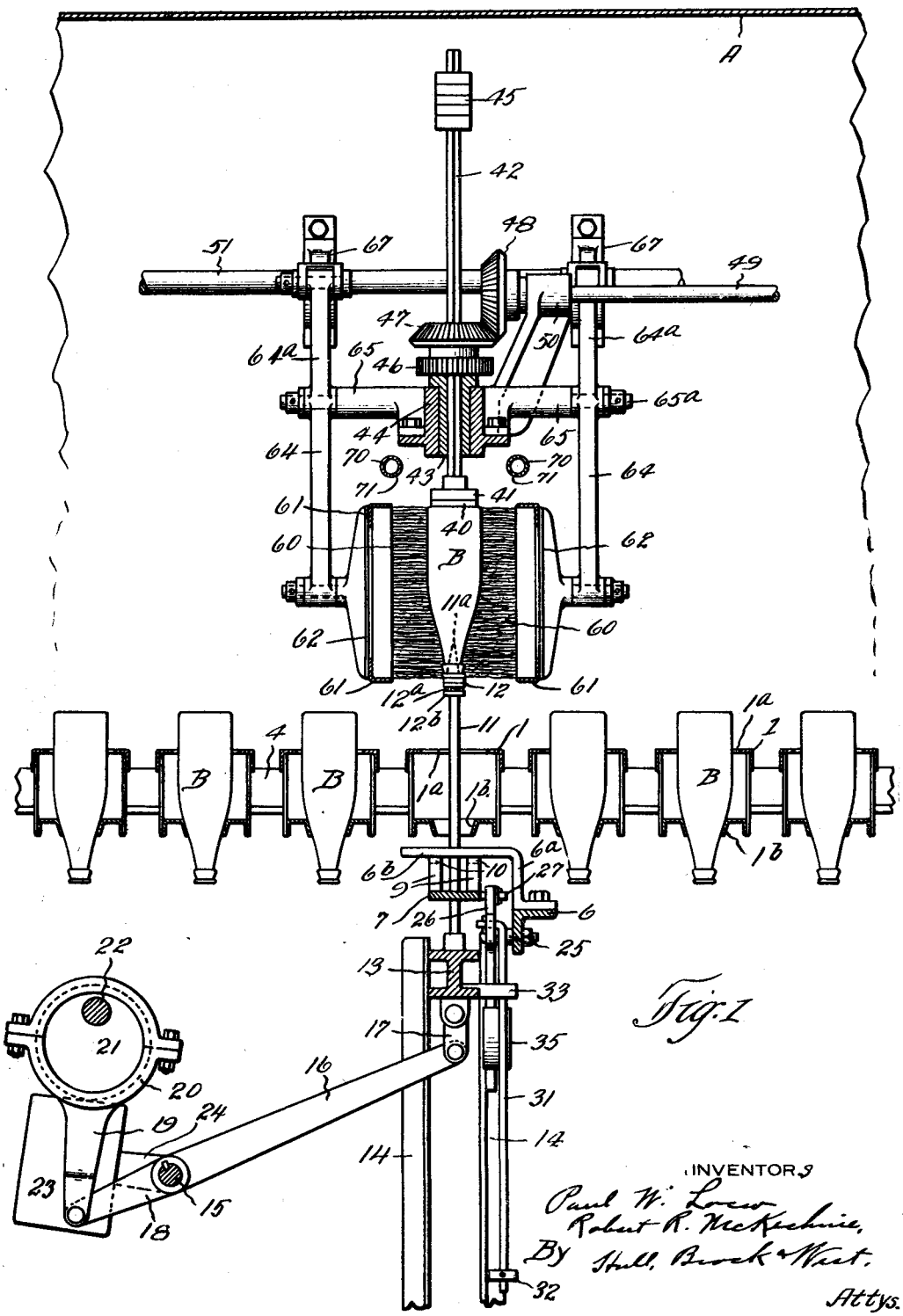
Figure 2:
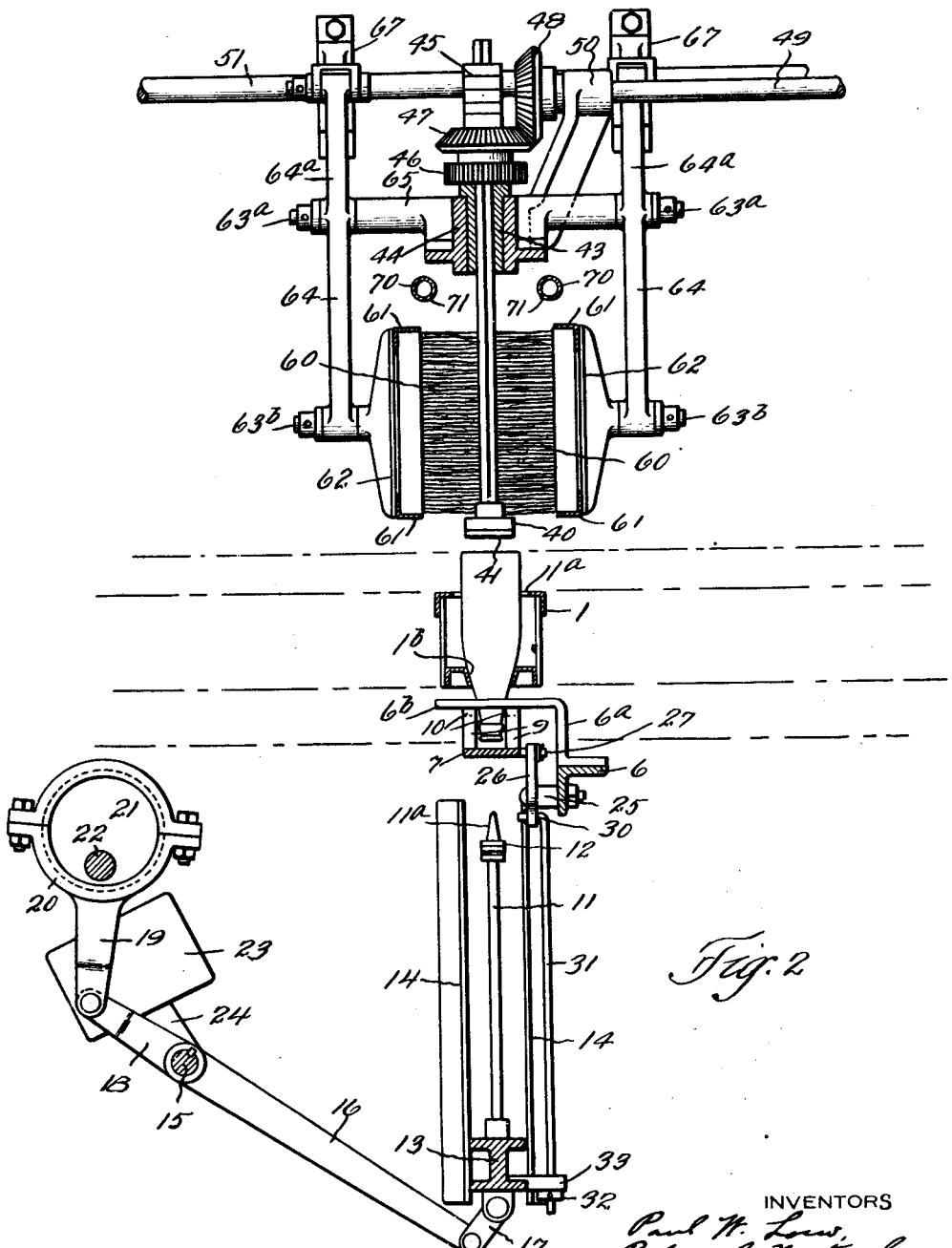

The general object of the invention is to enable bottles, in an apparatus of the aforesaid general character, to be brushed in a particularly efficient manner, with the consumption of a minimum time, and through the operation of a single brushing station or agency. Further and more limited objects of the invention will be explained hereinafter and will be accomplished in and through the construction and arrangement of parts shown in the drawings, wherein Fig. 1 represents a longitudinal sectional view through part of an apparatus for cleaning bottles, showing the brushes in elevation and one transverse series of bottles in elevated position whereby they are subjected to the action of the brushes; Fig. 2 is a view similar to Fig. 1, showing the positions of the parts when a series of bottles is in its lowered position, beneath the brushes, the other series of bottles and their supports being omitted; Fig. 3 is a transverse sectional view taken through part of the apparatus in front of the brushes, the operating parts being in the positions corresponding to those which they occupy in Fig. 1; Fig. 4 a view similar to Fig. 3 and showing the same parts in the positions which they occupy in Fig. 2; Fig. 5 is a detail in plan of the brush-reciprocating and bottle rotating mechanism; Fig. 6 is a detail in plan of the bottle-centering mechanisms showing the positions of the parts when a transverse series of bottles has been centered thereby; and Fig. 7 a similar view showing the positions of the parts prior to such actual centering operation.

In the operation of the mechanism shown herein, the following steps are performed:

(1) The series of bottles are advanced one step, by the conveyor feeding mechanism, in their transit through the apparatus.

(2) During and at the end of such feeding movement of the feeding-mechanism, the bottles in the appropriate transverse series are centered by suitable alining mechanisms above a corresponding transverse series of lifting rods, the rods being arranged directly below a transverse series of bottle-rotating shafts and below a pair of transversely extending reciprocating brushes.

(3) The bottles are lifted by their rods to bring the bottoms into engagement with pads on the bottoms of the rotating shafts and are raised, while rotating, between the reciprocating brushes.

(4) The rotating bottles are lowered to their seats on their cooperating transverse carrier member, the bottles being disengaged from the rotating pads during their descent.

(5) One of the bottle alining mechanisms is moved out of the path of travel of the depending bottle necks and mouths.

The details of construction whereby the above results are secured will now be described.

A represents generally the casing of a bottle washing apparatus of the general type referred to hereinbefore. In a complete apparatus, this casing will contain the usual tank or tanks for the liquids or solutions with which the insides and outsides of the bottles are treated. The casing is provided with rails supported from each side wall thereof, which rails support the endless conveyor on which the bottles are conducted through the casing. One of the transverse carriers is indicated at 1, the same having a top provided with openings 1$^a$ for the bodies of the bottles B and with tapered seats 1$^b$ in the bottom wall thereof to receive the corresponding tapered necks of the bottles. Each transverse carrier element 1 is connected at its sides to the corresponding side-chain links 2 of a conveyor, the links of the conveyor chains being provided with rollers 3 resting on rails 4 carried by brackets 5 secured to the sides of the casing. The conveyor, with the transverse carrier elements, will be moved intermittently through the casing, as is usual with numerous types of bottle washing apparatus and as exemplified in the patent to Charles H. Loew and John R. Gruetter aforesaid.

Below the rails 4 is a transversely-extending angle iron 6 to the upper flange of which is fastened pairs of angular fingers, each finger having a vertical portion $6^a$ and a horizontal portion $6^b$. The horizontal portions $6^b$ face the front or receiving end of the machine, being presented toward the bottles on the advancing transverse carriers. They are spaced apart a sufficient distance to receive therebetween the necks of the bottles B, the forwardly projecting ends of the fingers being beveled, as shown at $6^c$ (see particularly Figs. 6 and 7). It will be noted that the fingers $6^a$, $6^b$ of each pair are spaced apart a sufficient distance to enable the bottles to pass therethrough, the angle iron 6 being located below the mouths of the bottles. The purpose of these fingers is to aline accurately the bottles, along the fore-and-aft lines, directly above the tips of the lifting rods, which will be described hereinafter. For the purpose of accurately alining the bottles transversely with reference to the direction of travel thereof and to center them above the said lifting rods, the following construction is provided. A bar 7, having slots $7^a$ therein for the lifting-rods, extends transversely of the casing with its ends slidably mounted in brackets 8 which are secured to the sides of the casing and project inwardly therefrom, forming guides for the reciprocation of the said bar. The bar 7 is provided with pairs of angular fingers each having a vertical portion 9, a horizontally extending portion 10, and a beveled end $10^a$. The bar 7 is mounted beneath the horizontal portion $6^b$ of the other fingers and the horizontal portions 10 of the last mentioned fingers are preferably immediately below the horizontal portions of the other fingers and extend transversely of the casing. The bar 7 will be given a movement such that, when the necks of the bottles enter the spaces between the fingers $6^b$, the cooperating parts $7^a$ of the other fingers will be in the retracted positions shown in Fig. 7, so as not to interfere with the advancing movements of the bottles. When the bottles are at rest with their necks between the fingers $6^b$, then the bar 7 will be moved to the left of the position shown in Fig. 7 and the fingers 10 will aline the necks of the bottles transversely of the direction of travel thereof, and their mouths will then be centered directly above the ends of the lifting rods 11, which pass through the slots $7^a$. The mechanism for reciprocating the bar 7 intermittently will be described hereinafter.

The rods 11 are provided each with an anti-friction thrust bearing comprising the upper rotating plate 12, anti-friction balls $12^a$, and the bottom plate $12^b$, and the upper end of each rod is pointed, as shown at $11^a$, to facilitate its insertion into the mouth of a bottle thereabove. The rods are carried by a cross head 13 which is adapted to be moved upwardly and downwardly between guides 14 carried by the sides of the casing A. This cross head is reciprocated by means of a rock shaft 15 extending transversely of the apparatus and having a pair of arms 16 keyed thereto, each of the arms being pivotally connected by links 17 to the cross head 13. The shaft is rocked by means of an arm 18 which is keyed thereto, the opposite end of the arm being pivotally connected to an arm 19 carried by an eccentric strap 20 which embraces an eccentric 21 carried by the transversely extending shaft 22. It will be evident that, by rotating the shaft 22, the eccentric 21 and the connections between the same and the shaft 15 will cause the latter shaft to rock, thereby raising and lowering the cross head 13 and the lifting rods 11. The cross head and lifting rods are shown as counterbalanced by a weight 23 carried by an arm 24 which is also keyed to the shaft 15.

For the purpose of operating the bar 7 and the centering fingers carried thereby, a forked angle lever is pivoted at 25 to the vertical flange of the angle bar 6. One of the forks 26 is connected to the bar 7 by means of a pin 27 on the said bar entering a slot 28 in the said fork. The other fork 29 has pivoted thereto at the point 30 the upper end of a rod 31, the said rod being provided with a stop 32 adjustably secured to the lower end thereof and being slidably mounted in a projection 33 on the cross head 13. The forked lever is provided with a stem 34 having a counterbalancing weight 35 thereon. As soon as the lifting mechanism is moved upwardly from the position shown in Figs. 2 and 4 and prior to the insertion of the points $11^a$ of the lifting rods into the mouths of the bottles, the weight will have caused the lever arm 25 to move the bar 7 to the left, bringing the fingers 10 into centering engagement with the necks of the bottles. As the cross head descends, the projection 33 will engage the stop 32, pulling downwardly on the rod 31 and moving the bar 7 to the right and thus removing the fingers 10 from transverse register with the neck-receiving spaces between the fingers $6^b$. A series of bottles that has been moved upwardly and downwardly between the brushes can then be advanced without interference by the fingers 10, and the next-succeeding transverse series of bottles can be moved up to the position occupied by the series which has just been brushed.

As the cross head 13 is elevated, the points $11^a$ of the rods 11 enter the mouths of the bottles in the transverse series thereabove, lifting the bottles, with their mouths supported on the thrust-bearings $12$—$12^b$, between the reciprocating brushes (which will be described hereinafter). The bottoms of the bottles, as they are thus lifted, come into engagement with pads 40 of rubber or other suitable material carried on bottom plates 41 each of which is mounted upon the lower end of a squared shaft 42. Each of these shafts extends upwardly through a bushing 43, the bushings being rotatably supported in a cross bar 44 supported by the side walls of the casing. Each of these shafts has weights 45 removably applied to the upper end thereof thereby to retain the pads 40 in operative driving engagement with the bottoms of the bottles B. Each shaft 42 is provided with a gear 46 thereon, the said gears intermeshing. One of the shafts (the central one as shown herein) is provided with a bevel gear 47 thereon which meshes with a bevel gear 48 carried on a shaft 49, the inner end of the shaft being shown as mounted in a bracket 50 carried by the cross bar 44. The shaft 49 is driven from a shaft 51 by means of a sprocket 51ª on said shaft, a sprocket 49ª on the shaft 49, and a chain 52. As the shaft 51 is rotated, the shaft 49 will be also rotated, thereby rotating the shafts 42 through gears 46, 47 and 48. It will be evident that the bottles will be rotated as they are supported between the parts 12 and 41.

Reference has been made to the brushes. Two such brushes are shown, each indicated at 60 and each extending transversely of the casing. The brushes are each mounted between upper and lower angle irons 61, connected by brackets 62. Each brush is suspended from the cross bar 44 by means of a link 63 pivoted at its upper end to the cross bar, as shown at 63ª, and pivotally connected at its lower end to one of the brackets 62, as shown at 63ᵇ. Each of the brushes is also pivotally supported from the cross bar 44 by a lever pivoted intermediate its ends to the cross bar 44 by a pivot 63ª, the lower arm 64 of the lever corresponding to the link 63 and being pivotally connected to the other end of the brush by means of the pin 63ᵇ on the other bracket 62. The other arm 64ª of the lever is pivotally connected at 65 with an arm 66 carried by an eccentric strap 67 surrounding the eccentric 68, the said eccentric being mounted on the shaft 51. The corresponding end of the opposite brush is supported in like manner by the lever 64, 64ª, the upper end of the arm 64ª being connected to an eccentric strap 67; but the eccentrics 68, 68 are opposed to each other so that as one of the lever arms 64ª is moved forwardly, the other will be moved rearwardly, and vice versa, thus causing the brushes to work in opposite directions.

Above the brushes are pipes 70 having spraying apertures 71 therein for discharging any suitable cleaning liquid or solution upon the brushes and the bottles therebetween.

With the parts constructed and arranged as described, it is believed that the operation will be readily understood. Assuming the bottles to be on their transverse carriers and the cross head 13 in its lowered position the conveyor will be moved forwardly one step, bringing a carrier and the row of bottles thereon beneath the center of the space between the brushes and above the rods 11 and below the shafts 42. As the conveyor and carrier are thus moved, the bottle necks pass between the fingers 6ᵇ, thereby insuring accurate fore-and-aft alining of the bottle necks and mouths. As the lifting mechanism starts upwardly, the lug 33 moves away from the stop 32 and the weight 35 drops, rocking the lever arm 26 and throwing the bar 7 to the left, thereby moving the fingers 10 transversely beneath the fingers 6ᵇ and alining the bottle necks and mouths transversely of the casing. These two mechanisms insure the centering of the mouths of the bottles above the ends 11ª of the rods 11. The further continued movement of the cross-head causes the pointed ends of the rods to enter the mouths of the bottles and the bottles are lifted on the rotary thrust-bearings 12—12ᵇ, bringing their bottoms into engagement with the pads 40 on the bottoms of the rotating shafts 42. The bottles are reciprocated vertically while being rotated, between the horizontally reciprocating brushes 60. The weights 45 insure sufficient frictional engagement between the pads 40 and the bottoms of the bottles to insure the rotation of the bottles while clamped between the said pads and the bearings 12—12ᵇ. The downward movement of the cross head causes the bottles to be lowered through the brushes and returned to their seats in their carrier element. As the cross head nears its lowermost position, the projection 33 engages the stop 32 on the rod 31, thereby rocking the lever arm 26 to move the bar 7 to the right, which removes the centering fingers 10 from the path of movement of this series of bottles as well as from the path of movement of the next advancing series of bottles.

The apparatus disclosed herein is comparatively simple of construction and inexpensive of production, but has proven to be of marked efficiency in actual service in securing the efficient brushing of bottles and particularly in bottle-cleaning apparatus of the character with which it is employed.

Having thus described our invention, what we claim is:

1. In an apparatus for cleaning bottles, the combination, with a conveyor, of bottle carriers extending transversely of said conveyor and each adapted to support a series of bottles mouth-downward, brushing mechanism above said conveyor, mechanism in the path of movement of the bottles on said carriers and adapted to aline the bottles in the direction of their movement on said carriers, means for engaging the mouths of the bottles and for lifting them from each carrier and into operative relation to said brushing mechanism and for restoring the bottles when brushed to such carrier, bottle-alining mechanism movable at substantially right angles to the first mentioned mechanism and adapted to center the bottles above the engaging and lifting means, and connections between the second bottle-alining mechanism and the bottle-lifting means whereby the second alining mechanism will be moved into alining relation to the bottles prior to the elevation of the bottles by the lifting means and will be removed from bottle-engaging position by the lowering movement of the bottle-lifting means.

2. In an apparatus for cleaning bottles, the combination, with a conveyor, of bottle carriers extending transversely of said conveyor and each adapted to support a series of bottles mouth-downward, brushing mechanism above said conveyor, mechanism in the path of movement of the bottles on said carriers and adapted to aline the bottles in the direction of their movement on said carriers, means for engaging the mouths of the bottles and for lifting them from each carrier and into operative relation to said brushing mechanism and for restoring the bottles when brushed to such carrier, movable bottle-alining mechanism operable at substantially right angles to the lines of travel of the bottles, and connections between the second bottle-alining mechanism and the bottle-lifting means whereby the second alining mechanism will be moved into alining relation to the bottles thereby to center the bottles above their respective lifting means and prior to the engagement of such lifting means with the bottle mouths and will be removed from bottle-engaging position by the lowering movement of the bottle lifting mechanism.

3. In an apparatus for cleaning bottles, the combination, with a conveyor, of bottle carriers extending transversely of said conveyor and each adapted to support a series of bottles mouth-downward, bottle-cleaning mechanism above said conveyor, mechanism in the path of movement of the bottles on each carrier and adapted to aline the bottles in the direction of their movement on said carriers and located below the said cleaning mechanism, means for engaging the mouths of the bottles on each carrier and for lifting the bottles therefrom in operative relation to said cleaning mechanism and for restoring the bottles thereafter to said carrier, additional bottle-alining mechanism movable at substantially right angles to the lines of travel of the bottles, and adapted to center the bottles with respect to their respective engaging and lifting means, and connections between the bottle-engaging and lifting mechanism and the second alining mechanism whereby the latter mechanism will be moved into bottle-engaging position prior to the lifting of the bottles from the carrier and will be moved out of bottle-engaging position prior to the movement of the carrier from its position below said cleaning mechanism.

4. In a bottle-cleaning apparatus, the combination, with bottle cleaning mechanism, of a conveyor below said mechanism, bottle carriers extending transversely of said conveyor and each adapted to support a series of bottles mouth-downward thereon, means for engaging the mouths of the bottles for lifting the bottles from each carrier, successively, into operative relation to the cleaning mechanism and for restoring the bottles thereafter to such carrier, forwardly projecting bottle-engaging fingers below the bottle cleaning mechanism and arranged to engage the sides of the necks of the series of bottles passing therebetween thereby to aline the same in and through the movement of each carrier to a position below said cleaning mechanism, additional bottle-alining mechanism, movable at substantially right angles to the direction of movement of the conveyor, for engaging the fronts and backs of the necks of the bottles thereby to center the said bottles above their respective engaging and lifting means, and connections between the bottle-engaging and lifting means and the second bottle-alining mechanism whereby the said mechanism is moved into operative relation to the necks of the bottles prior to the engagement of said engaging and lifting means with the mouths of the bottles thereabove and are moved in the reverse direction by the downward movement of the bottle-engaging and lifting means.

5. In a bottle cleaning apparatus, the combination, with bottle cleaning mechanism, of a conveyor below said mechanism, bottle carriers extending transversely of said conveyor and each adapted to support a series of bottles mouth-downward thereon, means for engaging the mouths of the bottles for lifting the bottles from each carrier, successively, into operative relation to the cleaning mechanism and for restoring the bottles thereafter to such carrier, forwardly projecting bottle-engaging fingers below the bottle-cleaning mechanism and arranged to engage the sides of the necks of the series of bottles passing therebetween thereby to aline the same in and through the movement of each carrier to a position below said cleaning mechanism, and additional bottle-alining mechanism, movable at substantially right angles to the direction of movement of the conveyor, for engaging the fronts and backs of the necks of the bottles thereby to center the bottles above their respective engaging and lifting means.

6. In a bottle cleaning apparatus, the combination of a conveyor, bottle carriers extending transversely of the carrier and each adapted to support bottles mouth-downward thereon, bottle-cleaning mechanism above said conveyor, fixed means below the said bottle cleaning mechanism arranged to engage the sides of the necks of bottles as they are moved by said conveyor, thereby to aline the bottles in the direction of travel of their respective carriers, means for engaging the mouths of the bottles for raising the bottles into operative relation to the cleaning mechanism and for lowering them to their seats on their carrier, movable bottle-alining mechanism operating substantially transversely of the direction of movement of the conveyor thereby to center the bottles above their respective engaging and raising means, and connections between the bottle engaging and raising means and the second bottle-alining mechanism thereby to move such second mechanism into engagement with the necks of the bottles prior to lifting them from their seats and for moving such second mechanism in the reverse direction by the return movement of the bottle engaging and raising means.

7. In an apparatus of the character described, the combination of a conveyor, bottle carriers extending transversely of said conveyor and each adapted to support a series of bottles thereon mouth-downward, cleaning mechanism above said conveyor, bottle-alining mechanism below the cleaning mechanism and arranged to engage the sides of the necks of bottles as the carriers therefor are brought below the cleaning mechanism thereby to effect fore-and-aft alinement of the bottles on their respective carriers, means adapted to enter the mouth of each bottle for lifting the bottles from their seats into operative relation to the cleaning mechanism and for restoring them thereafter to said seats, and bottle-alining mechanism, independent of the first mentioned mechanism and movable substantially transversely thereof into and out of engagement with the necks of the bottles thereby to center the bottles above their respective lifting means.

8. In an apparatus of the character described, the combination of a conveyor, bottle carriers extending transversely of said conveyor and each adapted to support a series of bottles thereon mouth-downward, cleaning mechanism above said conveyor, bottle-alining mechanism below the cleaning mechanism, the bottle-alining mechanism consisting of pairs of fingers projecting toward the bottles on an approaching carrier and adapted to effect fore-and-aft alinement of the bottles on such carrier, means adapted to enter the mouth of each bottle for lifting the bottles from their seats into operative relation to the cleaning mechanism and for restoring them thereafter to said seats, and a second bottle-alining mechanism comprising pairs of fingers extending at substantially right angles to the fingers of the first mentioned mechanism and adapted to center the bottles above their respective lifting means, and means for moving the second series of fingers into and out of engagement with the necks of bottles on a carrier thereabove.

9. In a bottle cleaning apparatus, the combination of a conveyor, bottle carriers extending transversely of said conveyor, a pair of brushes above said conveyor and extending transversely thereof, means for reciprocating the said brushes each in directions reverse to the movements of the other, and means for lifting the bottles from each carrier between said brushes and for returning the bottles to their seats on such carrier.

10. In a bottle cleaning apparatus, the combination of a conveyor, bottle carriers extending transversely of said conveyor, a pair of brushes above said conveyor and extending transversely thereof, means for reciprocating said brushes, means for lifting the bottles from each carrier between said brushes and for returning the bottles to their seats on such carrier, and means for rotating the bottles while between the said brushes.

11. In a bottle cleaning apparatus, the combination of a conveyor, bottle carriers extending transversely of said conveyor, a pair of brushes above said conveyor and extending transversely thereof, means for reciprocating said brushes each in directions reverse to the movements of the other, means for lifting the bottles from each carrier between said brushes and for returning the bottles to their seats on such carrier, and means for rotating the bottles while between the said brushes.

12. In a bottle cleaning apparatus, the combination of a conveyor, bottle carriers extending transversely of said conveyor and each adapted to support a series of bottles mouth-downward thereon, cleaning mechanism above said conveyor, means for raising the bottles from each carrier into operative relation to the cleaning mechanism and for returning the bottles to their seats on such carrier, the last mentioned means comprising a transverse series of lifting rods each having a pointed end adapted to be inserted in the mouth of a bottle, each lifting rod being provided below the pointed end thereof with a rotatable thrust bearing for the mouth of a bottle, a transverse supporting frame above the cleaning mechanism, bushings rotatably supported in said frame, angle shafts mounted in said bushings and each having a bottle-bottom engaging portion at the lower end thereof, intermeshing gears carried by said bushings, means for driving one of said shafts, and weights removably applied to the upper end of each of said shafts.

13. In a bottle cleaning apparatus, the combination of a conveyor, bottle carriers extending transversely of said conveyor and each having seats for supporting a series of bottles mouth-downward thereon, a frame member extending transversely above said conveyor, bottle-bottom clamping members mounted on shafts supported by said frame member, a pair of links depending from each side of said frame member, a brush supported by each pair of links, one link of each pair having an arm, means cooperating with each arm for reciprocating the said brushes, and vertically movable bottle-mouth engaging means adapted to lift the bottles from each carrier successively and raise the bottles between the brushes with their bottoms in engagement with the rotating clamping members at the bottoms of said shafts and for returning the bottles to their seats.

14. In a bottle cleaning apparatus, the combination of a conveyor, bottle carriers extending transversely of said conveyor and each having seats for supporting a series of bottles mouth-downward thereon, a transverse series of shafts, bottle-bottom clamping members mounted on said shafts, a brush on each side of the series of shafts and above said bottle carriers, means for reciprocating the said brushes, and vertically movable bottle-mouth engaging means adapted to lift the bottles from each carrier successively and raise the bottles between the brushes with their bottoms in engagement with the rotating clamping members at the bottoms of said shafts and for returning the bottles to their seats.

15. In a bottle cleaning apparatus, the combination of a conveyor, bottle carriers extending transversely of said conveyor and each having seats to support a series of bottles mouth-downward, a pair of brushes above the said conveyor and extending transversely thereof, a frame member above said brushes and links suspending the said brushes from the said frame member, means for reciprocating the said brushes, bottle raising and lowering mechanism below the said brushes and comprising a transverse series of lifting rods each adapted to enter the neck of a bottle, cooperating bottle-bottom engaging means supported by said frame member, and means cooperating with the bottle-bottom engaging means for rotating the bottles while being raised and lowered from their seats on their respective carriers.

16. In a bottle cleaning apparatus, the combination of a conveyor, bottle carriers extending transversely of said conveyor and each having seats to support a series of bottles mouth-downward, a pair of brushes above the said conveyor and extending transversely thereof, means for reciprocating the said brushes each in directions reverse to the movements of the other, bottle raising and lowering mechanism below the said brushes and comprising a transverse series of lifting rods each adapted to enter the neck of a bottle, and means for rotating the bottles while supported on said rods.

In testimony whereof, we hereunto affix our signatures.

PAUL W. LOEW.
ROBERT R. McKECHNIE.